Oct. 27, 1970 E. M. TELLERMAN 3,536,923

NETWORK FOR DETECTING RESISTANCE CHANGES

Filed April 1, 1968

INVENTOR
EDWARD M. TELLERMAN

BY Edwin Levisohn & Henry R. Lerner
ATTORNEYS.

United States Patent Office 3,536,923
Patented Oct. 27, 1970

3,536,923

NETWORK FOR DETECTING RESISTANCE CHANGES

Edward M. Tellerman, East Rockaway, N.Y., assignor to Continental Instruments Corp., Lynbrook, N.Y., a corporation of New York Filed Apr. 1, 1968, Ser. No. 717,577
Int. Cl. G08b *13/24;* H01h *47/24*
U.S. Cl. 250—206 13 Claims

ABSTRACT OF THE DISCLOSURE

A network for translating a change in electrical resistance, such as provided by a photocell, into a predetermined function such as the activation of a signalling device. The signalling device is controlled by a relay which activates the signalling device only when the relay is unenergized. The relay is in series with a pair of transistor amplifiers, both of which must be conducting for the relay to remain in energized condition. The change in resistance of the photocell creates a change of potential across a condenser which, in turn, causes a temporary flow of current, which current affects the triggering current of a third transistor amplifier. This third transistor amplifier controls the other two transistor amplifiers in such a manner that whenever the triggering current of the third transistor amplifier is changed, either upwardly or downwardly, from a fixed value, one or the other of the two transistor amplifiers in series with the control relay will be rendered nonconducting to unenergize the control relay and thus activate the signalling device.

BACKGROUND OF THE INVENTION

Photocells have long been used in detecting devices, wherein there is associated therewith an external light source providing a beam of light directed on to the photocell. Interruption of the beam of light, the condition intended to be detected, causes a change in resistance of the photocell, which change in resistance is, through appropriate circuitry, translated into a desired function. Said function could range anywhere from the opening or closing of a door to the activation of a central alarm system.

The use of a photocell in the manner described above is not entirely satisfactory, especially where the existence of the photocell is preferably concealed, because it is usually not too difficult to detect the presence of a light beam and thus to compromise the detecting circuit of which the photocell is a part.

The above pointed out deficiencies of conventional type photocells have led to the development and use of photocells which are responsive to small changes in the surrounding light and thus do not require an independent light beam to be associated therewith. An example of a photoelectric device which is operated without the use of an independent light source is shown in U.S. Pat. No. 2,412,822. One of the problems, however, in the use of photoelectric cells which are responsive to small changes in light is that the accompanying change in resistance of the cell is relatively small. This in turn has made it difficult to develop circuitry which can, without being too complex, detect slight changes in resistance and translate such changes into the desired function.

The present invention provides a network which is extremely simple and economical in construction and which nevertheless efficiently translates small changes in resistance into a desired function.

SUMMARY OF THE INVENTION

In accordance with the present invention, the change in resistance resulting from detection of the event desired to be monitored is transformed into a change of potential across a condenser. Such change of potential causes a partial charge or discharge of the condenser with an accompanying current flow. Such current flow in turn is superimposed on to the triggering current of a transistor amplifier and such superimposition either decreases such triggering current sufficiently to interrupt the conduction thereof or increases such triggering current to correspondingly amplify the current flowing therethrough. This transistor amplifier controls a circuit path which includes a control relay for a signalling device, the control being of such nature that the aforementioned change in triggering current is instrumental in interrupting the control relay, and in turn activating the signalling device.

DESCRIPTION OF THE PREFERRED EMBODIMENTS

Figure 1:
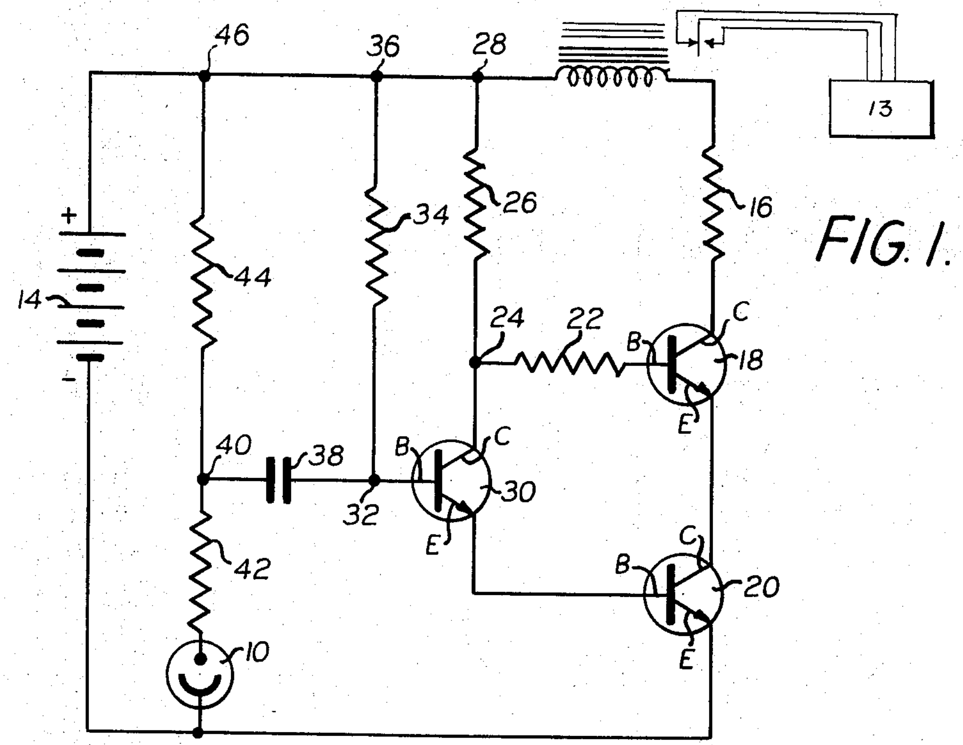
FIG. 1 represents a schematic circuit diagram of the network for detecting resistance changes in accordance with the invention.

Referring now to FIG. 1, there is shown a photocell 10 of the type which is sufficiently sensitive to be responsive to very slight changes in the surrounding light, such as might be caused by someone walking within the range of the photocell. Essentially, the slight change of light within range of the photocell effectuates a change in the resistance of the photocell and, with everything else remaining the same, effectuates the current flowing therethrough.

This slight fluctuation in the resistance of photocell 10 is what the circuit in FIG. 1 is intended to detect, such detection being ultimately expressed by the activation of a signalling device of any type which may be desired, whether audible, visual, or a combination of both. In FIG. 1, relay 12 is the instrumentality for activating the signalling device 13. More specifically, when relay 12 is energized, there is no activation of the associated signalling device, and when the energization of relay 12 is interrupted, the signalling device is activated. Control relay 12 is normally energized by battery 14 with current flow from the positive terminal of the battery, through relay 12, resistor 16, transistors 18 and 20, and back to the negative terminal of battery 14. Transistors 18 and 20 are conventional transistor amplifiers, each of which is provided with a base B, collector C, and emitter E. These transistors are conductive, from C to E, when triggering current of some predetermined minimum value flows from B to E, with the current flow from C to E being an amplification of the triggering current. In order for current to flow through control relay 12, and thus prevent the signalling device from being activated, it is clear, from the above, that both transistors 18 and 20 must be conducting.

A resistor 22 is connected between B of transistor 18 and junction 24, and resistor 26 extends between junctions 24 and 28. Another transistor amplifier 30 similar to transistors 18 and 20 has its collector C connected to junction 24, its emitter E connected to base B of transistor 20, and its base B connected to junction 32. Resistor 34 extends between junctions 32 and 36.

With reference to transistor 18, it will be noted that the triggering current therefor, from B to E thereof, is provided by the following continuous path: battery 14, junction 36, junction 28, resistor 26, junction 24, resistor 22, B–E of transistor 18, C–E of transistor 20, and back to the negative terminal of battery 14. In this path, it will be noted that the current flowing through resistor 22 and B–E of transistor 18, and the second path being through transistor 30 which, in effect, is shunting relation with the first path. Thus, an increased current flow through transistor 30, will result in a correspondingly decreased current flow through B–E of transistor 18 and vice versa. As a minimum triggering current flow is required from B to E of transistor 18 to render the latter conductive, there is a corresponding maximum amount of current flow permissible for transistor 30 above which transistor 18 cannot be triggered to become conducting. Thus, depending on the constants of the components in circuitry of FIG. 1, transistor 30 will permit current flow through transistor 18 so long as current flow through transistor 30 does not exceed a predetermined value.

On the other hand, transistor 20 receives its triggering current from transistor 30. Accordingly, if transistor 30 is conducting, triggering current will flow from B to E of transistor 20 to render the latter conducting. If transistor 30 is nonconducting, there is no path for triggering current for transistor 20 and the latter will not be conducting.

From the above it is seen that in order for both transistors 18 and 20 to be conducting, it is necessary that transistor 30 meet two conditions: (1) it must be conducting, and (2) the current flow may not exceed a predetermined fixed value. The various components in FIG. 1 are selected so that both said conditions are met when a predetermined but constant triggering current flows from B to E of transistor 30. If said current value is not reached, transistor 30 will not be triggered rendering transistor 30 nonconducting and thus transistor 20 nonconducting. If on the other hand, said current value through B–E of transistor 30 is exceeded, the amplified current flow through C–E of transistor 30 will not leave, thereby rendering it nonconductive. The value of triggering current from B to E of transistor 30 is thus critical and any variation thereof, in either direction, will interrupt current flow through control relay 12, to in turn activate the signalling device.

A condenser 38 is connected between junctions 32 and 40. Resistor 42 is a current limiting resistor for photocell 10 in series therewith, and resistor 44 is connected junctions 40 and 46. Since the only source of voltage in the circuit is D.C., there is no current flow across condenser 38 although there is a charge thereacross which will be dependent on the potential difference between junction 40 and junction 32.

The operation of the circuit in FIG. 1 is as follows:

When there is no change affecting the resistance of photocell 10, corresponding to a normal condition which is not intended to be detected, the D.C. current provided by battery 14 flows throughout the circuitry of FIG. 1, as described above, and provides precisely the predetermined triggering current for transistor 30 whereby both transistors 18 and 20 are conducting, so that there is current flow through control relay 12. Upon the happening of the condition to be detected, as for example someone passing within range of photocell 10, the resistance of photocell 10 will fluctuate, changing the amount of normal D.C. current flow through resistors 44, 42 and the photocell and thereby changing the potential at junction 40. Such change of potential at 40 will change the potential difference between junctions 40 and 32 and thus across condenser 38 to cause a partial charge or discharge of condenser 38, depending on whether the resistance of photocell 10 has been increased or decreased. Such change in potential across condenser 38 will cause some current flow, for the length of time it takes condenser 38 to charge or discharge, through triggering circuit B–E of transistor 30, in one direction or in the other. Such change in current, even though of small magnitude, is sufficient to upset the conductivity of either transistor 18 or 20. More specifically, if this change in current flow, even though small and temporary, is in the nature of an increase, it will effectively increase the amplified current flowing from C to E of transistor 30 and correspondingly decrease the current flow through triggering circuit B–E of transistor 18 to keep the latter from conducting. If on the other hand, the change in triggering current of transistor 30 is in the nature of a decrease, it will render transistor 30 nonconducting to in turn render transistor 20 nonconducting. Either way, therefore, a change in the resistance of resistor 10 will result in the interruption of current flow through control relay 12 to activate the signalling device. It will be noted that the capacitance of condenser 38 will significantly affect the time of charge or discharge, and this in turn will determine the length of time that the signalling device is activated. It will also be noted that condenser 38 will be responsive only to a change in current flow through photocell 10. Once the change has been completed, even though a current of different magnitude flows through photocell 10, the system will return to normalcy, with control relay 12 energized, although condenser 38 will now have a new charge thereacross. The system will then be ready again to detect another change in conditions which either increases or decreases the resistance of photocell 10.

Figure 2:
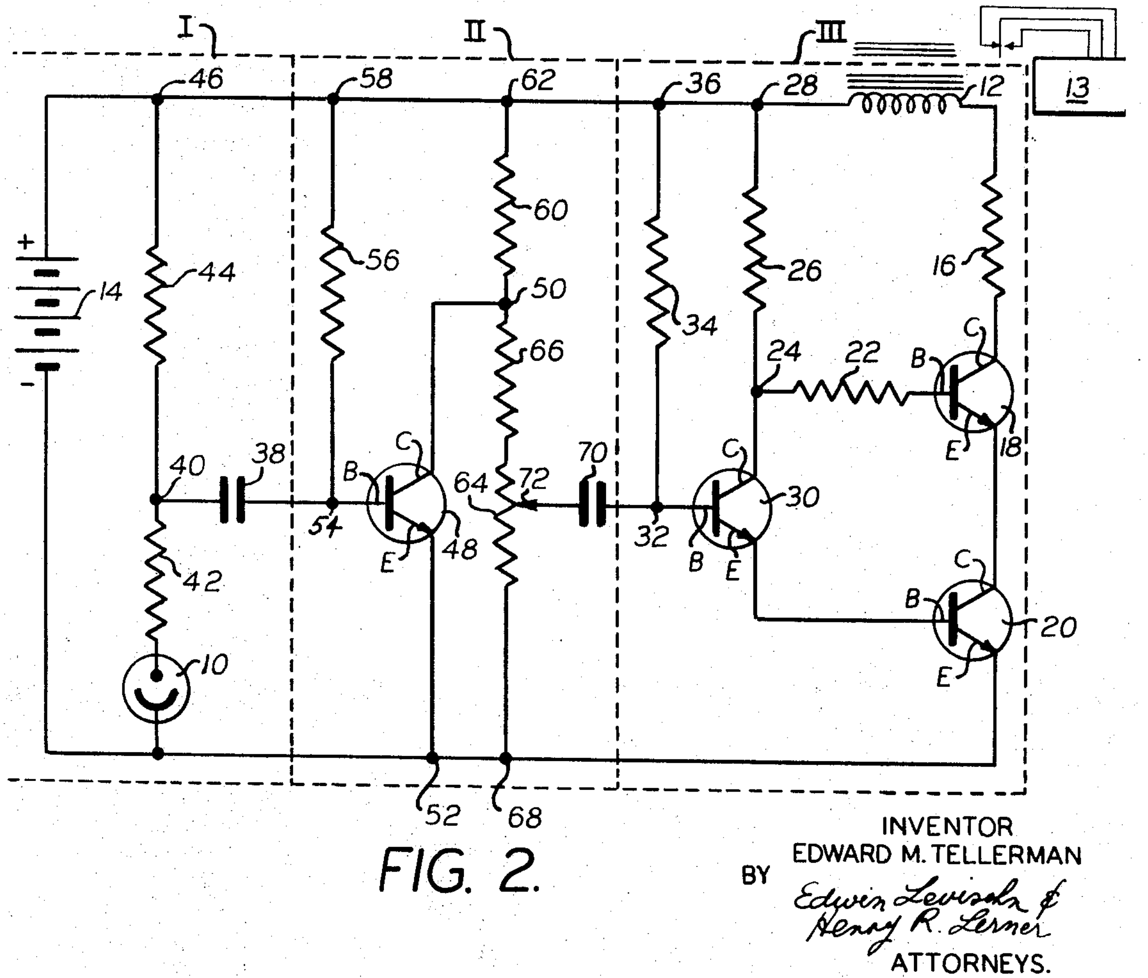
FIG. 2 represents a schematic circuit diagram of another embodiment thereof.

FIG. 2 shows another embodiment of the invention. Essentially, FIG. 2 incorporates all of the circuitry in FIG. 1 but adds thereto circuitry which renders the same more selectively sensitive. FIG. 2 is shown divided into three sections thereof identified as I, II and III. Sections I and III, if placed together, correspond to the circuit of FIG. 1 and all components shown in Sections I and III bear the same reference numerals as their corresponding components in FIG. 1. Section II includes the added components which consist of transistor amplifier 48 similar to transistors 18, 20 and 30, having its collector C connected to junction 50, its emitter E connected to junction 52 and its base B connected to junction 54. Resistor 56 is connected between junctions 54 and 58, resistor 60 is connected between junctions 50 and 62 and variable resistor (rheostat) 64 in series with resistor 66 is connected between junctions 50 and 68. Finally, a condenser 70 is connected between junction 32 and the adjustable terminal 72 of rheostat 64.

The operation of the circuit in FIG. 2 is as follows:

As previously described, a change in resistance of photocell 10 will cause a charge or discharge of condenser 38. This in turn causes a change of current flow through triggering circuit B–E of transistor 48 which translates itself into an amplified change in current flow from junction 50 and through C–E of transistor 48. Such change will cause a change in the current flow through resistors 64 and 66 to in turn change the potential at adjustable terminal 72. This change of potential at terminal 72 will change the voltage difference across condenser 70 and cause the latter to charge or discharge, as the case may be. Such charge or discharge of condenser 70 will change the triggering current through transistor 30 and have the same effect as the change in said transistor 30, due to the charge or discharge of condenser 38 as described in FIG. 1. Such effect, it will be recalled, consists of the termination of conduction of either transistor 18 or 20 which will interrupt current flow through control relay 12 and activate the signalling device. Thus, the operational concept of the circuit in FIG. 2 is identical to that in FIG. 1, except that it provides the following advantages. First, the circuitry of FIG. 2 is more sensitive to changes in resistance in photocell 10 since added amplification of such changes is obtained by means of transistor 48. Secondly, by providing rheostat 64, the voltage picked off by condenser 70 can be adjusted and in that way, the sensitivity of the circuitry is adjustable and can thus be more selective.

While the circuitry has been described in connection with a photocell whose slight change in resistance is intended to be detected, it will be understood that the same circuitry can be used to detect small resistance changes in other types of components. In this connection it should be noted that while a photocell resistance varies in response to a change in light conditions within range of the photocell, other components which may be used, in the identical circuitry, could be of the type whose resistance varies in response to changes in temperature, pressure or any other characteristic of the atmosphere surrounding such components.

While I have herein shown and described the preferred embodiments of my invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described my invention, what I claim and desire to secure by Letters Patent is:

1. A network for translating a change in electrical resistance into a predetermined function comprising, (1) a device whose electrical resistance varies in response to the occurrence of events intended to be detected, (2) a condenser electrically related to said device so that a change in resistance of said device causes a change in the charge of the condenser and an accompanying condenser current flow, (3) electrical control means which, when unenergized, causes the performance of said predetermined function, (4) a pair of transistor amplifiers in series with said control means and with a supply of D.C. voltage whereby said transistor amplifiers must both be conducting to maintain said control means in energized condition, (5) a third transistor amplifier electrically related to said pair of transistor amplifiers so that the two transistor amplifiers of said pair are both conducting only when said third transistor amplifier receives triggering current within a predetermined value range, (6) said condenser being electrically related to said third transistor amplifier so that any condenser current flow resulting from a change of resistance of said device causes a change in the triggering current of said third transistor amplifier, whereby one transistor amplifier of said pair becomes nonconducting to de-energize said control means and effectuate the performance of said predetermined function.

2. A network in accordance with claim 1, wherein the device comprises a photocell.

3. A network in accordance with claim 1, wherein the electrical control means comprises a relay which, when unenergized, is operative to activate a signalling device.

4. A network in accordance with claim 3, wherein the device comprises a photocell.

5. A network in accordance with claim 1, wherein said third transistor amplifier is in shunting relation with the triggering circuit of one of the two transistor amplifiers of said pair so that an increase in current flow through said third transistor amplifier causes a corresponding decrease of triggering current of said one transistor amplifier to render the latter nonconducting.

6. A network in accordance with claim 5, wherein the triggering circuit of the other of the two transistor amplifiers is in series with the emitter of said third transistor amplifier whereby said other transistor amplifier is rendered nonconducting when said third transistor amplifier is nonconducting.

7. A network in accordance with claim 6, wherein the device is a photocell whose electrical resistance varies in response to a change of light within range thereof.

8. A network in accordance with claim 1, wherein there is further provided amplifier means for amplifying said accompanying condenser current flow, resistor means electrically related to said amplified current so that the latter correspondingly affects the potential across said resistor means, another condenser electrically related to said resistor means so that a change of potential thereacross causes a change in the charge of said another condenser and an accompanying another condenser current flow which is greater than said first mentioned accompanying condenser current flow, said another condenser being related to said third transistor amplifier so that any another condenser current flow affects the triggering circuit thereof.

9. A network in accordance with claim 8, wherein said resistor means includes a variable resistor for adjusting the sensitivity of said network.

10. A network in accordance with claim 8, wherein the device is a photocell whose electrical resistance varies in response to a change of light within range thereof.

11. A network in accordance with claim 5, wherein there is further provided amplifier means for amplifying said accompanying condenser current flow, resistor means electrically related to said amplified current so that the latter correspondingly affects the potential across said resistor means, another condenser electrically related to said resistor means so that a change of potential thereacross causes a change in the charge of said another condenser and an accompanying another condenser current flow which is greater than said first mentioned accompanying condenser current flow, said another condenser being related to said third transistor amplifier so that any another condenser current flow affects the triggering circuit thereof.

12. A network in accordance with claim 6, wherein said resistor means includes a variable resistor for adjusting the sensitivity of said network.

13. A network in accordance with claim 7, wherein there is further provided amplifier means for amplifying said accompanying condenser current flow, resistor means electrically related to said amplified current so that the latter correspondingly affects the potential across said resistor means, another condenser electrically related to said resistor means so that a change of potential thereacross causes a change in the charge of said another condenser and an accompanying another condenser current flow which is greater than said first mentioned accompanying condenser current flow, said another condenser being related to said third transistor amplifier so that any another condenser current flow affects the triggering circuit thereof.

References Cited

UNITED STATES PATENTS 3,235,857 2/1966 Bagno ---------- 340—258 X

JAMES W. LAWRENCE, Primary Examiner

E. R. LA ROCHE, Assistant Examiner

U.S. Cl. X.R.

250—214, 221; 307—311; 315—156; 317—124, 148.5 340—258